(12) United States Patent
Kakuko et al.

(10) Patent No.: US 9,158,183 B2
(45) Date of Patent: Oct. 13, 2015

(54) STEREOSCOPIC IMAGE GENERATING DEVICE AND STEREOSCOPIC IMAGE GENERATING METHOD

(71) Applicant: FUJITSU LIMITED, Kawasaki-shi (JP)

(72) Inventors: Norihiro Kakuko, Kawasaki (JP); Teruyuki Sato, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 445 days.

(21) Appl. No.: 13/658,505

(22) Filed: Oct. 23, 2012

(65) Prior Publication Data

US 2013/0155200 A1    Jun. 20, 2013

(30) Foreign Application Priority Data

Dec. 15, 2011 (JP) ................ 2011-274380

(51) Int. Cl.
*H04N 13/02* (2006.01)
*G03B 17/56* (2006.01)
*H04N 13/00* (2006.01)
*G03B 35/10* (2006.01)

(52) U.S. Cl.
CPC ............. *G03B 17/565* (2013.01); *G03B 35/10* (2013.01); *H04N 13/0007* (2013.01); *H04N 13/0217* (2013.01); *H04N 13/0285* (2013.01); H04N 2013/0074 (2013.01)

(58) Field of Classification Search
CPC ................. G03B 17/565; G03B 35/10; H04N 2013/0074; H04N 13/0007
USPC ............................................. 348/49; 382/199
See application file for complete search history.

(56) References Cited

U.S. PATENT DOCUMENTS

| 5,671,450 | A | 9/1997 | Suzuki |
| 2005/0174427 | A1* | 8/2005 | Yoshida ................... 348/55 |
| 2009/0109281 | A1* | 4/2009 | Mashitani et al. ............. 348/43 |
| 2010/0124359 | A1* | 5/2010 | Vaidya ................... 382/103 |
| 2011/0293191 | A1* | 12/2011 | Shin et al. .................... 382/199 |
| 2013/0141539 | A1* | 6/2013 | Awazu et al. ................ 348/46 |
| 2013/0258462 | A1* | 10/2013 | May et al. .................... 359/464 |

FOREIGN PATENT DOCUMENTS

| JP | 8-036229 | 2/1998 |
| JP | 2000-314834 | 11/2000 |
| JP | 2004-101666 | 4/2004 |
| JP | 2004-129186 | 4/2004 |
| JP | 2005-045328 | 2/2005 |
| JP | 2006-041741 | 2/2006 |
| JP | 2008-160561 | 7/2008 |

* cited by examiner

*Primary Examiner* — Sath V Perungavoor
*Assistant Examiner* — Fabio Lima
(74) *Attorney, Agent, or Firm* — Fujitsu Patent Center

(57) ABSTRACT

A stereoscopic image generating device includes: a brightness calculation unit that, on an image that is photographed using a stereo adapter, obtains the brightness representative value of the first area where neither of two beams from the object is incident; a threshold value determining unit that obtains a threshold value based on the brightness representative value; and an object area extracting unit that extracts two sets of pixels having brightness value higher than the threshold value on the image, as a second area where one of the two beams is incident and a third area where the another of the two beams is incident, and produces a stereoscopic image by a pair of a first partial image that is cut out from the second area, and a second partial image that is cut out from the third area.

6 Claims, 8 Drawing Sheets

FIG.2
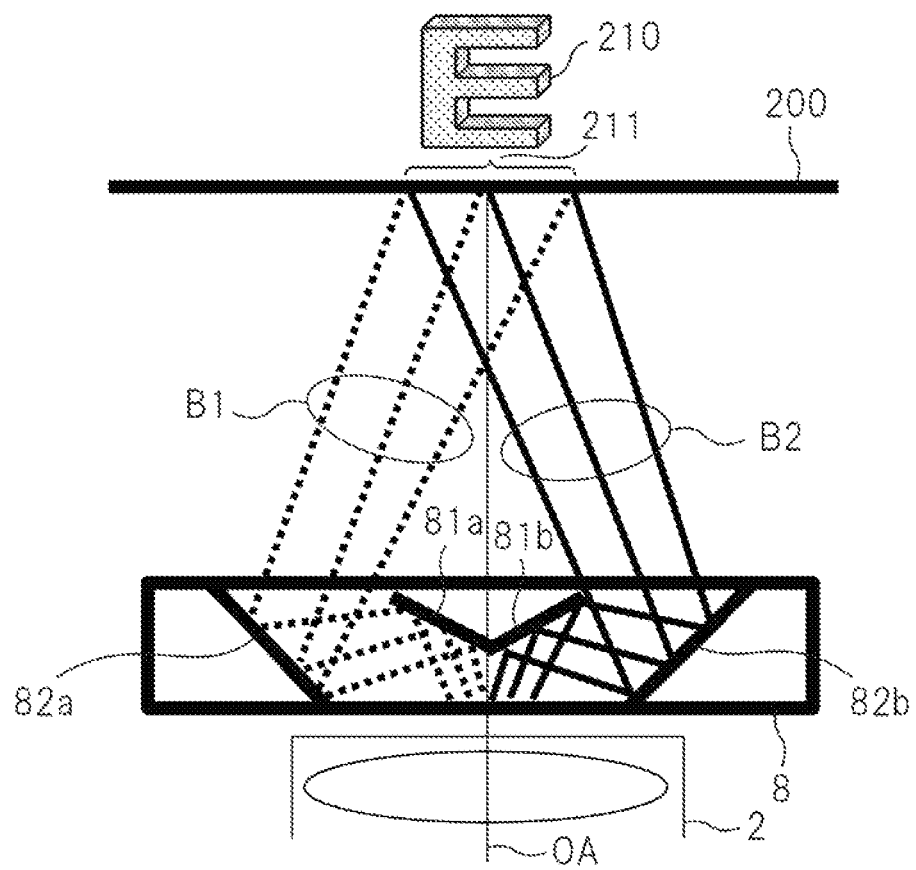
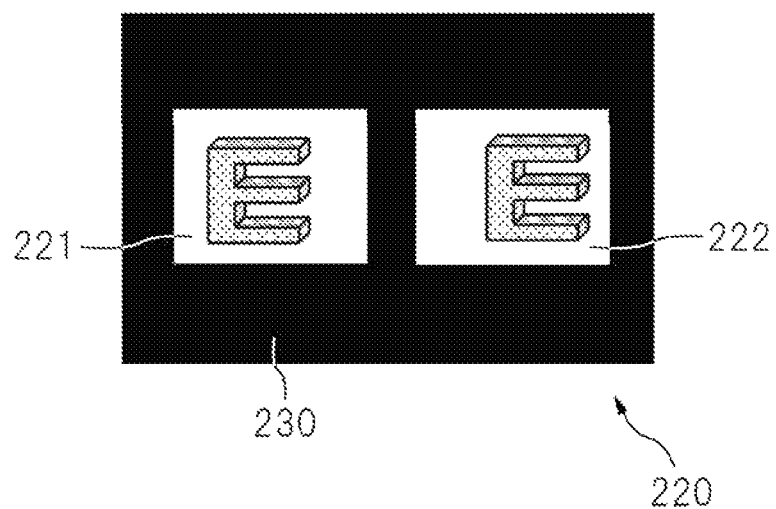

FIG.3A
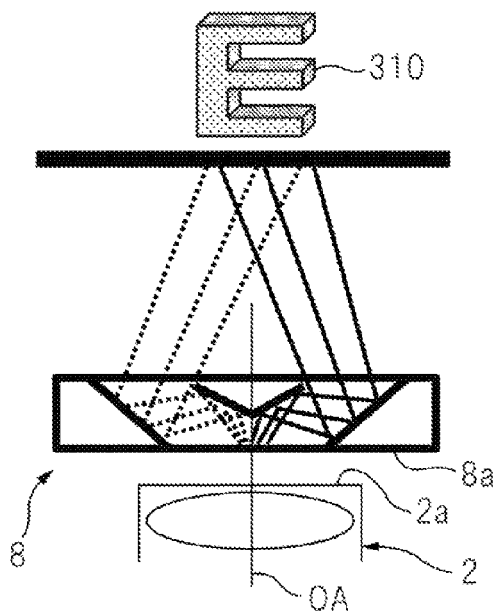
FIG.3B
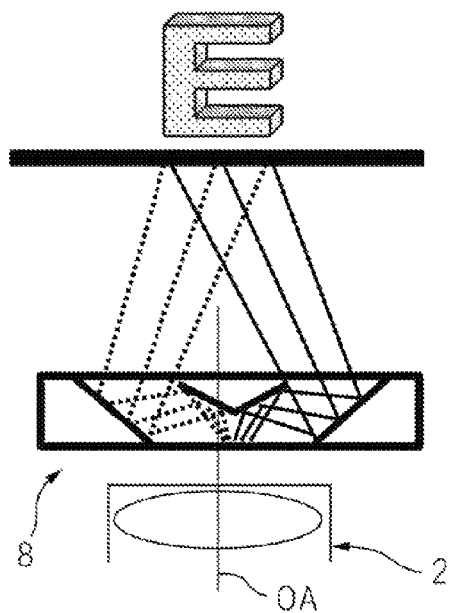
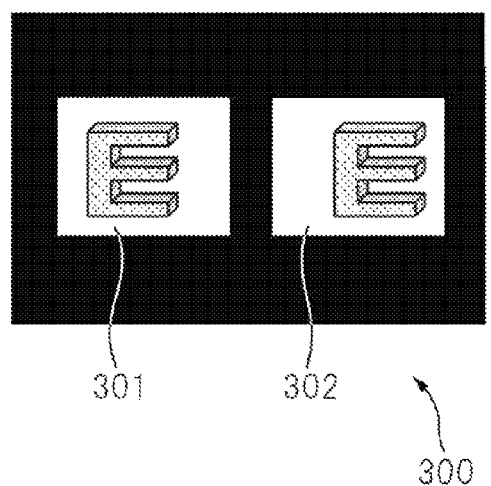
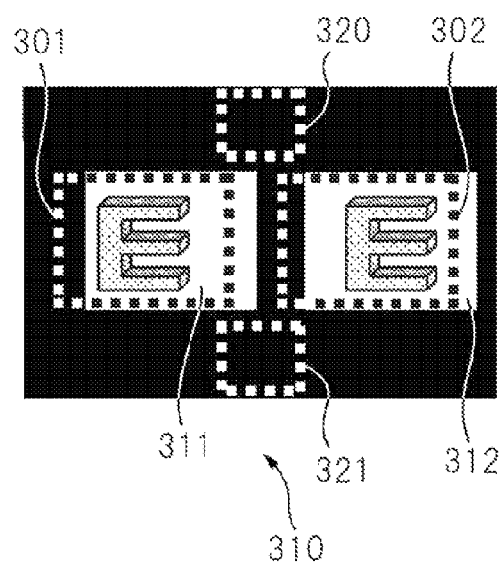

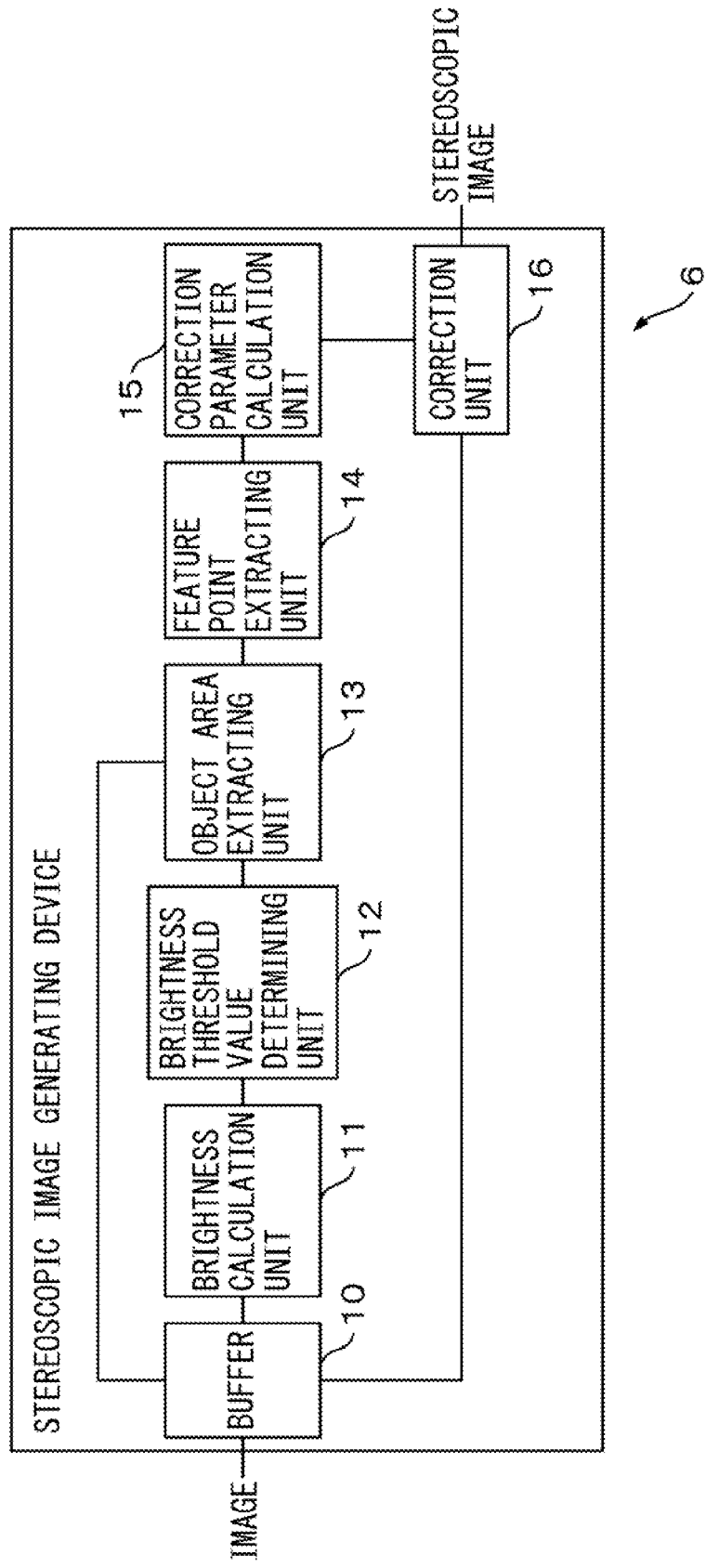

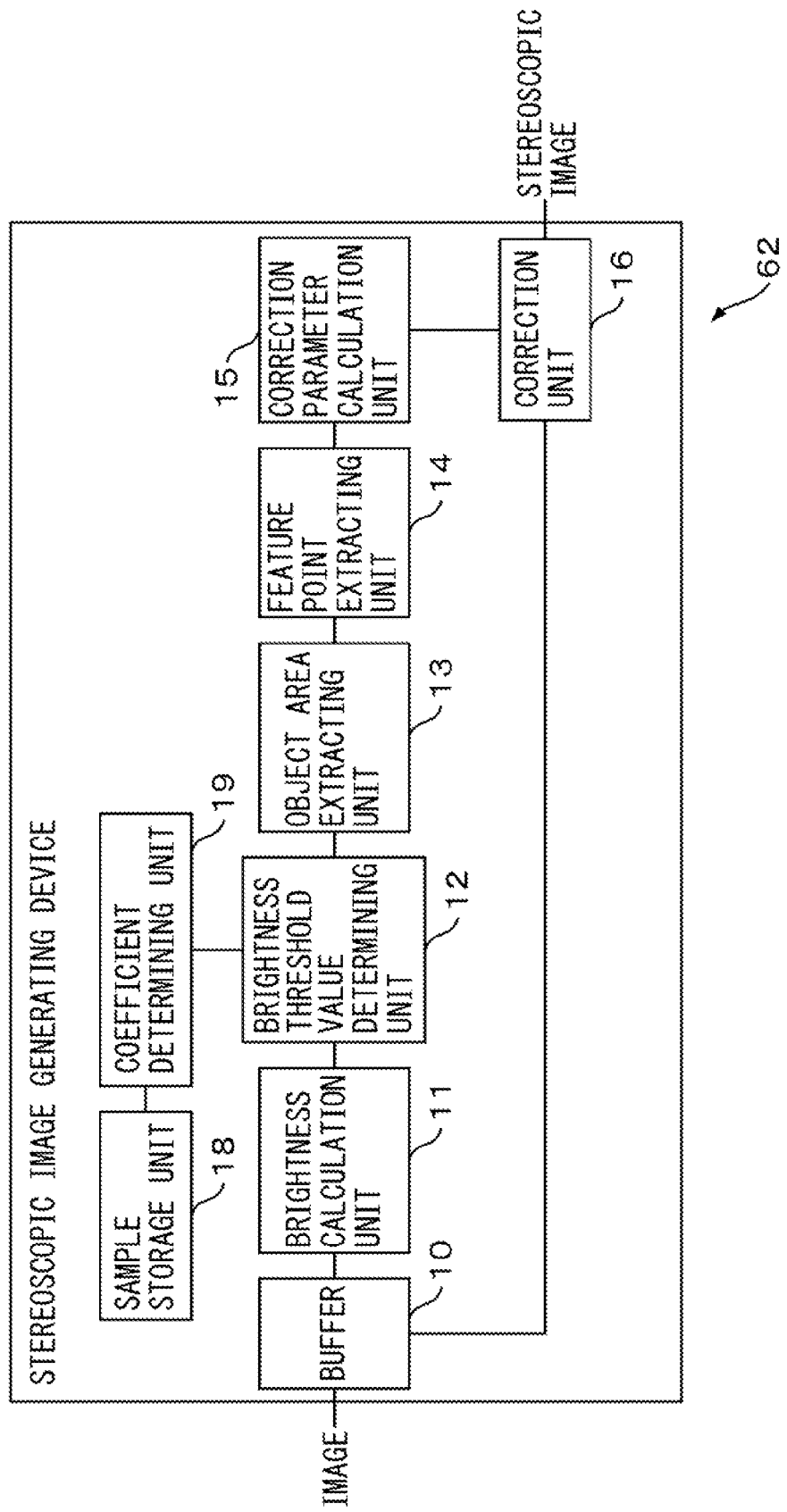

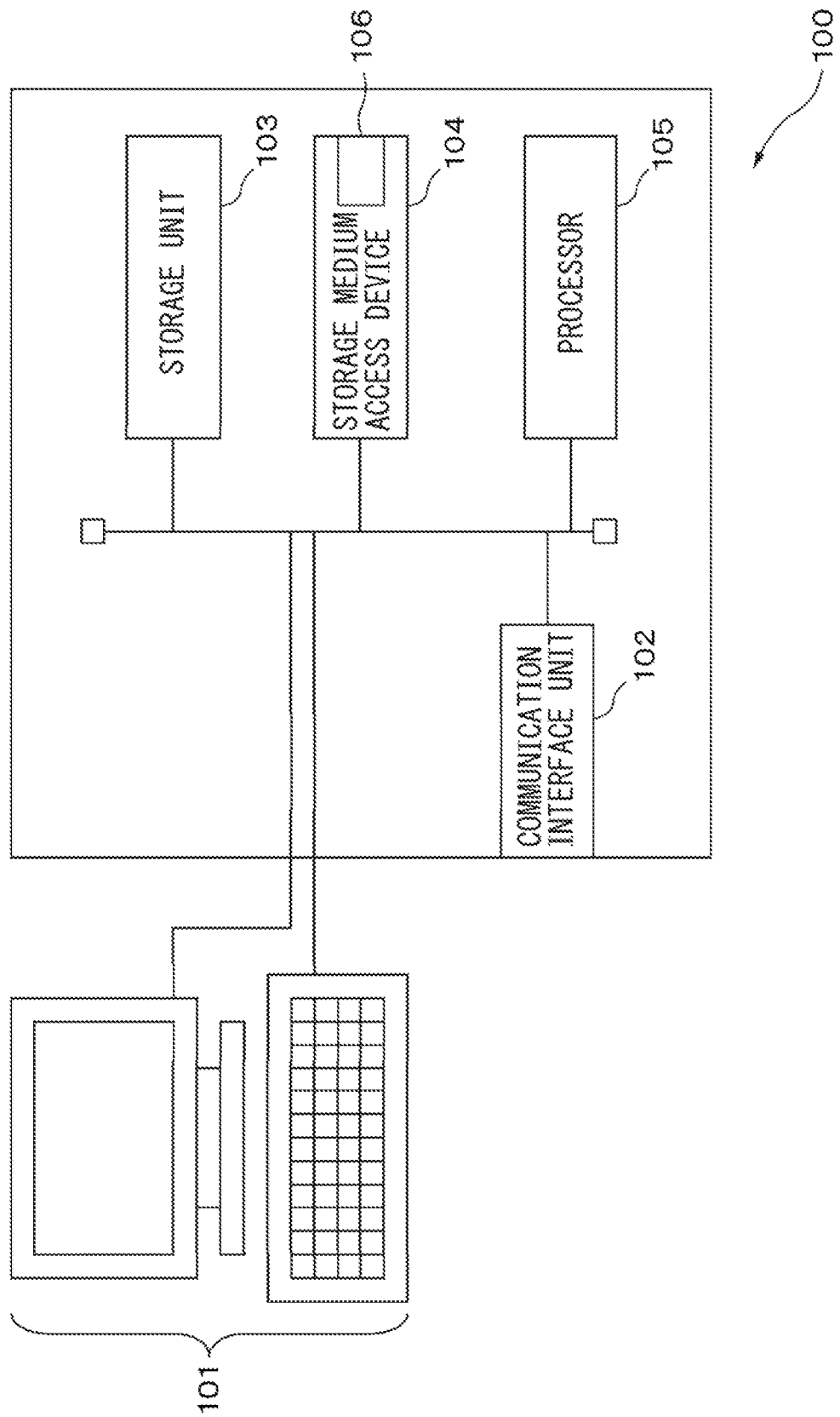

STEREOSCOPIC IMAGE GENERATING DEVICE AND STEREOSCOPIC IMAGE GENERATING METHOD

CROSS-REFERENCE TO RELATED APPLICATION

This application is based upon and claims the benefit of priority of the prior Japanese Patent Application No. 2011-274380, filed on Dec. 15, 2011, and the entire contents of which are incorporated herein by reference.

FIELD

The embodiments discussed herein are related to a stereoscopic image generating method and a stereoscopic image generating device which generate a stereoscopic image from images photographed by a camera having a stereo adapter mounted thereto which allows an object to be photographed from two different directions.

BACKGROUND

Heretofore, research for producing three-dimensional images has been made. As one method of producing a three-dimensional image, a method of displaying two images of an object photographed from different directions side by side, and showing these two images to the viewer's left eye and right eye respectively, has been known. A pair of images used in this method is referred to as a stereoscopic image.

To generate a stereoscopic image, a stereo adapter that is attached to the front plane of the imaging lens of a monocular camera and forms two images when an object is viewed from different directions in the left half and the right half of the imaging plane of the camera, is known (see, for example, Japanese Laid-Open Patent Publication No. 8-36229 and Japanese Laid-Open Patent Publication No. 2004-101666). The stereo adapter has two pairs of two mirrors, which are, for example, arranged to be line-symmetric with respect to the center of the stereo adapter in the horizontal direction, so that the camera is able to form images of an object which see the object from two different directions. Inner mirrors included in the mirror pairs are located in the front plane of the imaging lens, and are arranged such that the reflecting planes are directed toward the imaging lens and tilted in the horizontal direction with respect to the optical axis of the imaging lens. Then, the inner mirrors guide the beams from the object, and reflected by outer mirrors included in the mirror pairs to the imaging lens. The outer mirrors are arranged in the horizontal direction with respect to the imaging lens and further on the outer side than the inner mirrors, and the reflecting planes of the outer mirrors are directed toward the object. By this means, images of the object, when the object is viewed from the positions of the outer mirrors, are formed in the left half and right half on the imaging plane of the imaging lens. Consequently, by cutting out the areas where images of the object are captured from the left half and right half of an image acquired by photographing the object using a stereo adapter, and making these areas the left-eye image and right-eye image, a stereoscopic image is acquired.

When photographing an object using a stereo adapter, since the size of the two inner mirrors inside the stereo adapter is smaller than the photographing range of the imaging lens, vignetting of light occurs by the housing of the stereo adapter. Due to the vignetting, there is a poorly illuminated area in the focal plane of the imaging lens, and, as a result, there is a dark area in an image generated by photographing an object using a stereo adapter. Note that, for ease of explanation, a dark area that is produced by vignetting on an image will be hereinafter referred to as "vignetting area". Then, when a vignetting area is included in part of a left-eye image or a right-eye image, a dark area is included in part of a three-dimensional image that is produced using the left-eye image and right-eye image, and therefore the quality of the three-dimensional produced image is reduced. Therefore, a technology for setting in advance the areas for cutting the left-eye and right-eye images from an image generated by photographing an object using a stereo adapter, such that vignetting area is not included in the left-eye-image and right-eye image, is disclosed (see, for example, Japanese Laid-Open Patent Publication No. 2004-129186, and Japanese Laid-Open Patent Publication No. 2005-45328).

However, every time the stereo adapter is attached to the lens barrel of the camera, the mounting position of the stereo adapter with respect to the lens may shift. Then, when the mounting position of the stereo adapter shifts, the position of the vignetting area on the image also shifts. Consequently, depending on the mounting position of the stereo adapter, a part of the vignetting area may be superimposed on the areas from which the left-eye and right-eye images are cut.

On the other hand, determining whether or not vignetting occurs by a wide converter attached to the front plane of an imaging lens based on whether or not the brightness values of the four corners of an image are equal to or lower than a predetermined threshold value, is disclosed (see, for example, Japanese Laid-Open Patent Publication No. 2000-314834). Further, dividing an image into a plurality of blocks and determining whether or not vignetting occurs by blocking the light from a flash device by a lens barrel, based on the distribution of blocks having brightness equal to or lower than a threshold value, is disclosed (see, for example, Japanese Laid-Open Patent Publication No. 2006-41741). Furthermore, this patent literature discloses changing the threshold value depending on photographing conditions such as the amount of light emitted, and so on.

However, the brightness in a vignetting area changes depending on the brightness of the object or its surroundings and so on. This is, for example, because a part of stray light having entered into the housing of the stereo adapter may be reflected inside the housing and arrive at the imaging lens, and the amount of stray light also varies depending on the brightness of the object and so on. Consequently, even if the threshold value is changed in accordance with the photographing conditions, it may not be possible to accurately identify the vignetting area and the areas where beams from the object are incident.

On the other hand, using the level of pixel values in an ineffective pixel area where light is not incident due to vignetting as a black level brightness value, and correcting the values of pixels in the light-concentrated range of an optical system, is disclosed (see, for example, Japanese Laid-Open Patent Publication No. 2008-160561).

However, with the technology described in Japanese Laid-Open Patent Publication No. 2008-160561, no consideration is given to the fact that the position of the vignetting area may shift due to the shift of the mounting position of the stereo adapter. Consequently, depending on the mounting position of the stereo adapter, part of the image of the object or its surroundings may be captured in the ineffective pixel area that is set in advance. Then, the brightness values of the pixels where the image of the object or its surroundings is captured become higher than the brightness values of pixels in the vignetting area. As a result, even if the technology described in Japanese Laid-Open Patent Publication No. 2008-160561 is used to remove the vignetting area from an image generated by photographing an object using a stereo adapter, it may not be possible to obtain the brightness value of the vignetting area accurately.

SUMMARY

According to one embodiment, a stereoscopic image generating device is provided. This stereoscopic image generating device includes: a brightness calculation unit that, on an image generated by photographing an object using a stereo adapter that divides light from the object into two beams and guides the two beams to an imaging unit, obtains a brightness representative value of a first area where the two beams are not incident regardless of a mounting position of the stereo adapter to the imaging unit; a threshold value determining unit that, based on a relationship between the brightness representative value and a threshold value for distinguishing between a pixel included in the first area on the image, and a pixel included in one of a second area where one of the two beams is incident and a third area where the other of the two beams is incident, determines a threshold value corresponding to the brightness representative value; and an object area extracting unit that extracts two sets of pixels having brightness value higher than the threshold value on the image, as the second area and the third area, and produces a stereoscopic image by a pair of a first partial image that is cut out from the extracted second area, and a second partial image that is cut out from the third area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating a relationship between a configuration of a stereo adapter and an image of an object on an image.

FIG. 3A and FIG. 3B are diagrams each illustrating an example of a positional relationship between a relative position a stereo adapter with respect to an imaging unit, and an object area on an image generated by the imaging unit.

FIG. 4 is a configuration diagram of a stereoscopic image generating device according to a first embodiment.

FIG. 7 is a configuration diagram of a stereoscopic image generating device according to a fourth embodiment.

FIG. 8 is a configuration diagram of a computer that operates as a stereoscopic image generating device when executing a computer program to implement the functions of the units of a stereoscopic image generating device according to each embodiment or its variation.

DESCRIPTION OF EMBODIMENTS

Stereoscopic image generating devices according to various embodiments or their variations will be described with reference to the accompanying drawings. The stereoscopic image generating devices generate a stereoscopic image by cutting out two sets of pixels having brightness values higher than a predetermined brightness threshold value, from an image generated by photographing an object using a stereo adapter, as two areas each capturing an image of the object. Then, the stereoscopic image generating devices determines the brightness threshold value based on the representative value of the brightness values in a reference area on the image, included in the area where neither of two beams that are incident from the object via the stereo adapter is incident, regardless of the mounting position of the stereo adapter, i.e., the vignetting area. By this means, this stereoscopic image generating device accurately cuts out the areas where the object is captured, even when the mounting position of the stereo adapter shifts.

Note that, in the present specification, an area including an object on an image will be referred to as an "object area".

In the present embodiment, the stereoscopic image generating device is incorporated in a digital camera, a mobile telephone with a camera, or a mobile information terminal with a camera, on which a stereo adapter can be mounted.

Figure 1:
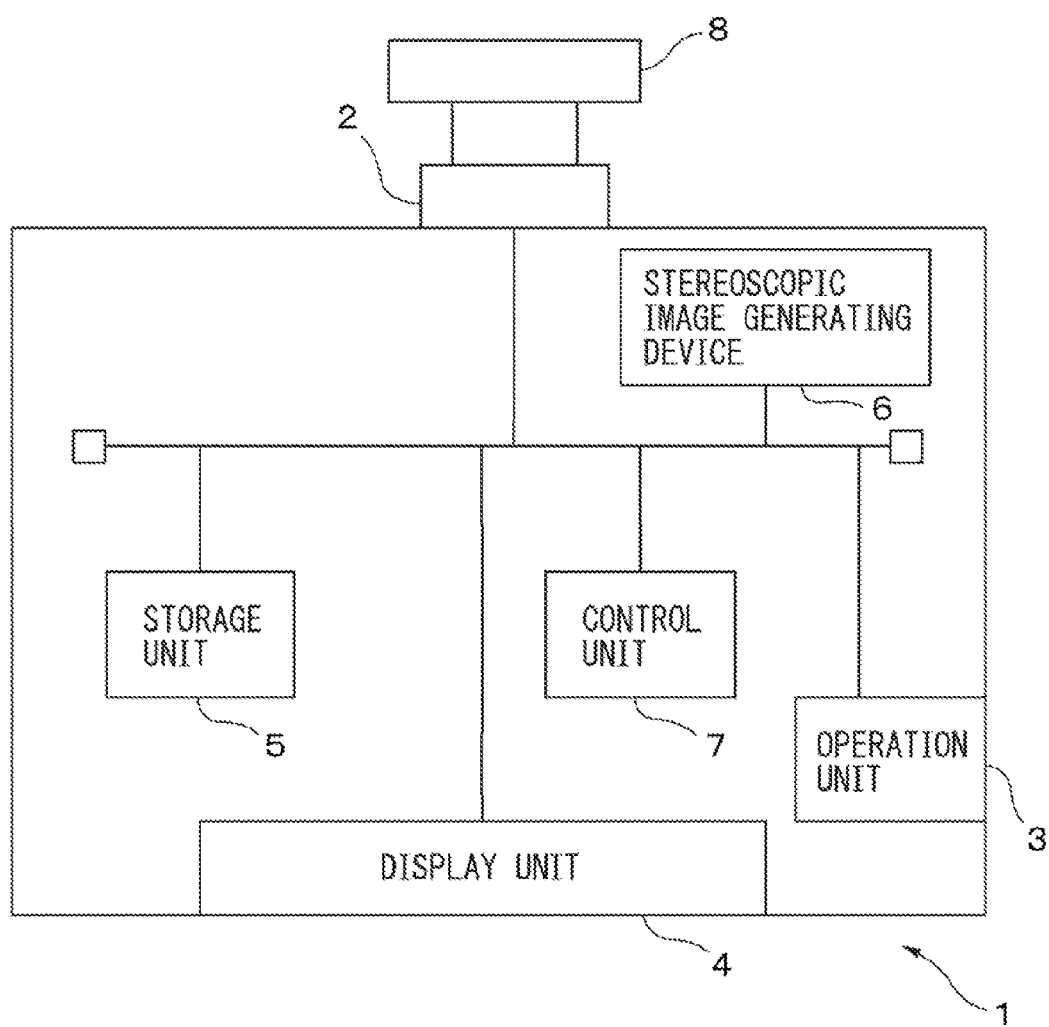
FIG. 1 is a schematic configuration diagram of a digital camera in which a stereoscopic image generating device is incorporated.

FIG. 1 is a schematic configuration diagram of a digital camera incorporating a stereoscopic image generating device. As illustrated in FIG. 1, the digital camera 1 is an example of a stereoscopic imaging device, and includes an imaging unit 2, an operation unit 3, a display unit 4, a storage unit 5, a stereoscopic image generating device 6 and a control unit 7. In addition, a stereo adapter 8 is attached to the front plane of an imaging optical system provided in the imaging unit 2. Furthermore, the digital camera 1 may have an interface circuit (not illustrated) that complies with a serial bus standard such as the universal serial bus, to connect the digital camera 1 with other devices such as computers and televisions. The control unit 7 and the other units of the digital camera 1 are connected by, for example, a bus.

The imaging unit 2 has an image sensor having an array of solid state imaging elements that are arranged in a two-dimensional arrangement, and an imaging optical system that forms an image of the object in the left half and in the right half of the image sensor. Then, the imaging unit 2 generates an image in which images of the object are captured in both the left half area and the right half area on the image. Every time an image is generated, the imaging unit 2 transmits the generated image to the stereoscopic image generating device 6.

The operation unit 3 has, for example, various operation buttons or dial switches to allow the user to operate the digital camera 1. Then, the operation unit 3 transmits control signals for starting photographing, focusing and so on, and setup signals for setting the shutter speed, aperture diameter and so on, to a control unit 7, according to operations by the user.

The display unit 4 has, for example, a display device such as a liquid crystal display device, and displays various information that is received from the control unit 7 or images generated by the imaging unit 2. Note that the operation unit 3 and display unit 4 may be formed integrally using, for example, a touch panel display.

The storage unit 5 has, for example, a readable and writable, and volatile or non-volatile semiconductor memory circuit. Then, the storage unit 5 stores stereoscopic images that are generated by the stereoscopic image generating device 6. In addition, the storage unit 5 may store images that are received from the imaging unit 2. Furthermore, when the functions of the stereoscopic image generating device 6 are realized by a computer program that is executed on a processor provided in the control unit 7, the computer program may be stored as well.

From an image generated by photographing an object using the stereo adapter 8, the stereoscopic image generating device 6 cuts out the area including the object captured in the left half of the image as the left-eye image, and cuts out the area including the object captured in the right half of the as the right-eye image. Note that, for ease of explanation, the left-eye image will be hereinafter referred to as "left image" and the right-eye image will be hereinafter referred to as "right image." Then, the stereoscopic image generating device 6 obtains a set of correction parameters for matching the positions of the image of the object captured in the left image and the image of the object captured in the right image. Then, the stereoscopic image generating device 6 corrects at least one of the left image and the right image using the set of correction parameters. The stereoscopic image generating device 6 will be described in detail later.

The control unit 7 has at least one processor and its peripheral circuitry. Then, the control unit 7 controls the entirety of the digital camera 1.

The stereo adapter 8 has a mounting mechanism (not illustrated) for attaching the stereo adapter 8 to the front plane of the imaging unit 2, and two pairs of mirrors for forming images when the object is viewed from two different directions on the imaging plane of the imaging unit 2.

FIG. 2 is a schematic diagram illustrating the relationship between the configuration of the stereo adapter 8 and the object on an image that is generated by the imaging unit 2. As illustrated in FIG. 2, the stereo adapter 8 has, in its inside, left-eye mirrors 81a and 82a and right-eye mirrors 81b and 82b. Note that the left-eye mirrors 81a and 82a and the right-eye mirrors 81b and 82b are, as mounted on the digital camera 1, arranged to be line-symmetric with respect to the center of the stereo adapter 8 in the horizontal direction. Then, the mirrors 81a and 81b are located in the front plane of the imaging optical system of the imaging unit 2, and their reflecting planes are directed toward the imaging unit 2 and are arranged to be tilted with respect to the optical axis OA of the imaging optical system in the horizontal direction. On the other hand, the mirrors 82a and 82b are placed further on the outer side than the mirrors 81a and 81b, and their reflecting planes are directed toward the object plane 200. Then, the mirrors 82a and 82b reflect beams B1 and B2 from the object 210 located on the object plane 200, toward the mirrors 81a and 81b. Then, the beams B1 and B2 are reflected by the mirrors 81a and 81b and are incident on the imaging optical system of the imaging unit 2. The orientation of each mirror is adjusted so that an area 211 including the object 210 is formed in both the left half area and the right half area on the image sensor of the imaging unit 2.

In FIG. 2, an object area 221 including the object 210 by the beam B1 is formed in the left half of the image 220 generated by the imaging unit 2, and an object area 222 including the object 210 by the beam B2 is formed in the right half of the image 220. Then, around the object areas 221 and 222, there is a vignetting area 230 where the beams B1 and B2 are not incident due to vignetting by the stereo adapter 8.

Generally, the brightness in the vignetting area 230 is lower than the brightness in the object area 221 or in the object area 222. Consequently, by digitizing an image using an adequate brightness threshold value, it is possible to distinguish between the vignetting area and the object area. However, even in the vignetting area, stray light may be incident, and therefore the brightness of pixels in the vignetting area varies due to the brightness of the object or its surroundings and so on. Consequently, when the brightness threshold value is too low, part of the vignetting area is also wrongly extracted as an object area. By contrast with this, when the brightness threshold value is too high, relatively dark pixels are excluded from an object area.

On the other hand, as described above, the brightness values of the pixels in the vignetting area vary depending on the amount of stray light that is reflected inside the housing of the stereo adapter 8 and arrives at the imaging plane of the imaging unit 2, the sensitivity of the image sensor of imaging unit 2, and so on. Then, the amount of stray light varies depending on the aperture diameter of the imaging optical system of the imaging unit 2, the shutter speed, the brightness of the object or its surroundings, and so on. These have influence not only on the brightness of pixels included in the vignetting area, but also on the brightness of pixels included in the object area. In other words, there is a correlation relationship that, when the brightness values of the pixels included in the vignetting area are high, the brightness values of the pixels included in the object area also become high. Consequently, regardless of the mounting position of the stereo adapter 8, when the area to be included in the vignetting area on an image is specified, the stereoscopic image generating device 6 is able to determine an adequate brightness threshold value based on the brightness in the vignetting area.

FIG. 3A and FIG. 3B are diagrams each depicting an example of the positional relationship between the relative position of the stereo adapter 8 with respect to the imaging unit 2, and object areas on an image generated by the imaging unit 2. In FIG. 3A, the stereo adapter 8 is adequately attached to the imaging unit 2, such that the back plane 8a of the stereo adapter 8 is parallel to the front plane 2a of the imaging unit 2 and the center of the stereo adapter 8 in the horizontal direction matches the optical axis OA of the imaging optical system of the imaging unit 2. In this case, on an image 300 that is generated by the imaging unit 2, two object areas 301 and 302 are formed to be line-symmetric with respect to the center of the image 300.

On the other hand, in FIG. 3B, the stereo adapter 8 is attached such that the center of the stereo adapter 8 shifts further to the right than the optical axis OA of the imaging optical system of the imaging unit 2. Consequently, object areas 311 and 312 formed on an image 310 also shift further to the right than the object areas 301 and 302 as of when the stereo adapter 8 is attached adequately, indicated by the dotted lines.

Note that, when the stereo adapter 8 shifts in the vertical direction with respect to the imaging optical system of the imaging unit 2, depending on the magnitude of that shift, the positions of the object areas also shift in the vertical direction on the image.

In this way, the positions of object areas change depending on the mounting position of the stereo adapter 8 to the imaging unit 2. However, the range of positions which the stereo adapter 8 can be mounted to the imaging unit 2 is limited. The range of positions is generally limited by the structure of the mounting mechanism (not illustrated) provided in the stereo adapter 8, the structure of the lens barrel of the imaging unit 2, and so on. Consequently, in an image generated by the imaging unit 2, there is an area to be a vignetting area, regardless of the mounting position of the stereo adapter 8. For example, an area 320 and an area 321, which are near the upper end and near the lower end of the center of the image 310 in the horizontal direction, respectively, and which are depicted by dotted lines in FIG. 3B, do not always include object areas, and the areas 320 and 321 are entirely included in the vignetting area.

Therefore, the stereoscopic image generating device 6 determines a brightness threshold value for extracting object areas, based on the representative value of the brightness values in an area that is constantly included in the vignetting area entirely on an image, regardless of the mounting position of the stereo adapter 8.

The stereoscopic image generating device 6 will be described below in detail. FIG. 4 is a configuration diagram of a stereoscopic image generating device 6. As illustrated in FIG. 4, the stereoscopic image generating device 6 includes a buffer 10, a brightness calculation unit 11, a brightness threshold value determining unit 12, an object area extracting unit 13, a feature point extracting unit 14, a correction parameter calculation unit 15, and a correction unit 16. These units provided in the stereoscopic image generating device 6 may be mounted in the stereoscopic image generating device 6 each as a separate circuit, or may be provided as one integrated circuit that realizes the functions of these units.

Alternately, the stereoscopic image generating device 6 may also be formed integrally with the control unit 7. In this case, these units provided in the stereoscopic image generating device 6 are implemented as, for example, function modules to be realized by a computer program that is executed on a processor provided in the control unit 7. Then, various data that is generated by the stereoscopic image generating device or that is utilized by the stereoscopic image generating device is stored in a storage unit 5.

The buffer 10 has, for example, a volatile semiconductor memory circuit, and stores an image input in the stereoscopic image generating device 6, and a left image and a right image that are cut out by the object area extracting unit 13, on a temporary basis.

On an image generated by photographing an object using the stereo adapter 8, the brightness calculation unit 11 obtains the representative value of brightness values in a reference area within a vignetting area, regardless of the mounting position of the stereo adapter 8. In the vignetting area, neither of the two beams that pass the left and right mirror systems provided in the stereo adapter 8, is incident. Then, the brightness calculation unit 11 makes the brightness representative value be the reference brightness value for determining the brightness threshold value.

As described above, the range of positions where the stereo adapter 8 can be mounted to the imaging unit 2 is limited. Therefore, to determine the reference area, a plurality of images by the imaging unit 2 while changing the position of the stereo adapter 8 variously in the range, are generated in advance. Then, an area that is commonly included in the vignetting area in each image, is determined to be the reference area. Information to represent the border of the reference area (for example, the upper left edge coordinates and lower right edge coordinates of the reference area when the reference area is rectangular, or the center coordinates and radius of the reference area when the reference area is round) is stored in advance in the non-volatile memory provided in the brightness calculation unit 11.

Note that a plurality of reference areas may be set. For example, the area 320 and the area 321 illustrated in FIG. 3B may be both set as reference areas. In this case, the brightness calculation unit 11 may make the average value of the representative values of the reference areas be the reference brightness value.

Upon receiving an image generated by photographing an object using the stereo adapter 8 from the imaging unit 2, the brightness calculation unit 11 specifies the reference area in the image with reference to the memory. Then, the brightness calculation unit 11 calculates the representative value of the brightness values of the reference area as the reference brightness value. Note that the representative value of the brightness values in the reference area may be, for example, the average value or median of the brightness values of the pixels included in the reference area, or a brightness value corresponding to a predetermined cumulative number from the minimum brightness value in a cumulative histogram of the brightness values of the reference area. The predetermined cumulative number is, for example, 20%, 30%, or 60% of the total number of pixels included in the reference area.

The brightness calculation unit 11 passes the reference brightness value to the brightness threshold value determining unit 12.

The brightness threshold value determining unit 12 determines a brightness threshold value used to distinguish an image into object areas and other areas, based on the reference brightness value. As described above, when the reference brightness value increases higher, the brightness values of the pixels included in the object areas are also estimated to be high. In particular, when the amount of light increase in accordance with changes in the aperture diameter of the imaging optical system, shutter speed, the brightness of the object or its surroundings and so on, the reference brightness value, which is the representative value of the brightness values of the reference area, also increases. Therefore, the brightness threshold value determining unit 12 determines the brightness threshold value, based on the relationship between the reference brightness value and the brightness threshold value, such that the brightness threshold value increases as the reference brightness value is higher.

For example, the relationship between the reference brightness value and the brightness threshold value is determined by the following equation:

$$Th = \alpha + \beta \times br \qquad \text{(Equation 1)}$$

$br$ is the reference brightness value, and $Th$ is the brightness threshold value. In addition, $\alpha$ and $\beta$ are both constants. $\alpha$ and $\beta$ are determined in advance based on a plurality of sample images that are generated by the imaging unit 2 according to different photographing conditions such as, for example, the imaging sensitivity, shutter speed and aperture diameter, or environmental conditions such as the brightness of the object and its surroundings. To be more specific, from each of these sample images, a reference brightness value and a brightness threshold value, which allows accurate cutting of object areas, are determined experimentally, for example. Then, for the pair of the reference brightness value and the brightness threshold value found with respect to each sample image, $\alpha$ and $\beta$ are determined, using, for example, the steepest descent method or the simulated annealing method, such that the square sum of errors as of when equation (1) is applied, becomes the minimum. For example, when the brightness value of each pixel is represented by eight bits, the maximum value of the brightness values is 255, and the minimum value of the brightness values is 0, $\alpha=90$ and $\beta=30$ may be set.

$\alpha$ and $\beta$ are stored in advance in, for example, a non-volatile memory provided in the brightness threshold value determining unit 12. Then, the brightness threshold value determining unit 12 calculates a brightness threshold value corresponding to the reference brightness value, according to equation (1).

Note that the brightness threshold value determining unit 12 may determine the brightness threshold value based on a monotonically increasing function other than equation (1), that makes the brightness threshold value higher as the reference brightness value becomes higher. For example, the brightness threshold value determining unit 12 may determine the brightness threshold value according to the following equation instead of equation (1):

$$Th = \alpha + \beta \times \sqrt{br}$$  (Equation 2)

Alternately, by calculating a brightness threshold value for each value which the reference brightness value might take, according to equation (1) or equation (2), a reference table representing the relationship between the reference brightness value and the brightness threshold value may be prepared. Then, this reference table may be stored in the memory provided in the brightness threshold value determining unit 12. In this case, with reference to the reference table, the brightness threshold value determining unit 12 may determine a brightness threshold value corresponding to the reference brightness value.

The brightness threshold value determining unit 12 passes the brightness threshold value to the object area extracting unit 13.

The object area extracting unit 13 reads an image generated by the imaging unit 2 from the buffer 10, and, from the image, extracts two object areas where one of the two beams that pass the left and right mirror systems of the stereo adapter 8 is incident. Furthermore, the object area extracting unit 13 cuts out areas which have a predetermined size and include the object, from each object area, and makes these areas be the left image and the right image.

The object area extracting unit 13 obtains a set of pixels having brightness values higher than the brightness threshold value in the left half of the image, and make this set of pixels be the left object area. Similarly, the object area extracting unit 13 obtains a set of pixels having brightness values higher than the brightness threshold value in the right half of the image, and make this set of pixels be the right object area. Alternately, the object area extracting unit 13 may extract pixels having brightness values higher than the brightness threshold value by comparing each pixel against the brightness threshold value, over the entire image. Then, by performing a labeling process for each extracted pixel, the object area extracting unit 13 may obtain sets of pixels having brightness values higher than the brightness threshold value, and, among these sets, extract two areas in order from the area including the greatest number of pixels, as the object areas. By this means, depending on the mounting position of the stereo adapter 8, even when one of the two object areas overlaps the center of the image in the horizontal direction, the object area extracting unit 13 is able to extract the two object areas.

Furthermore, the object area extracting unit 13 may perform morphological dilation and erosion operations for the sets of pixels having brightness values higher than the brightness threshold value, and thereby include isolated pixels among the pixels having brightness values higher than the brightness threshold value, in any of the object areas.

In each of the object areas, the object area extracting unit 13 sets a rectangular area of a predetermined size around the center of gravity of the object area, as the left image cutting range and the right image cutting range. Then, the object area extracting unit 13 cuts the areas in the cutting ranges as the left image and the right image, from the image. Since the size of the area on the image where vignetting does not occur can be learned in advance, the predetermined size may be made the size of the area where vignetting does not occur.

The object area extracting unit 13 stores the left image and the right image in the buffer 10, and also passes these to the feature point extracting unit 14.

The feature point extracting unit 14 extracts a plurality of pairs of feature points corresponding to the same points on the object from the left image and the right image.

For example, the feature point extracting unit 14 extracts candidates of feature points from one of the left image and the right image. For example, a plurality of candidates of feature points are extracted from the left image. Consequently, the feature point extracting unit 14 detects each of a plurality of points by, for example, applying a corner detector to the left image, as a feature point candidate. Note that the feature point extracting unit 14 may use a Harris detector, for example, as the corner detector. Alternatively, the feature point extracting unit 14 may use a detector that detects characteristic points, other than a corner detector, in order to extract feature point candidates from the left image. As such detector, the feature point extracting unit 14 may use, for example, a scale-invariant feature transform (SIFT) detector.

Next, for every feature point candidate extracted from the left image, the feature point extracting unit 14 sets a predetermined area around the candidate at the center, as a template. Then, the feature point extracting unit 14 calculates the similarity between the template and the right image by, for example, performing template matching while changing the relative positions between the template and the right image, and obtains the position where the similarity is the maximum, as a feature point on the right image corresponding to the candidate of the feature point on the left image. At this time, for a feature point candidate of interest, the feature point extracting unit 14 sets the corresponding pixel on the right image as the first search point. Then, the feature point extracting unit 14 calculates the similarity with respect to the search point and 8 nearby pixels or 24 nearby pixels in its surroundings, and sets the pixel where the similarity is the maximum among them, as the next search point. Then, the feature point extracting unit 14 may repeat the above processes until the search point no longer moves and make the last search point found be a feature point. Note that, for similarity, the feature point extracting unit 14 calculates the normalized cross-correlation value between the template and the area on the right image which is compared with the template. Alternately, the feature point extracting unit 14 may calculate the reciprocal of the total sum $\Delta$ of the absolute values of the brightness differences between the corresponding pixels in the template and the area on the right image which is compared with the template, or $1/(1+\Delta)$, as the similarity.

The feature point extracting unit 14 may make a candidate point of a feature point on the left image and the corresponding point on the right image be a pair of feature points corresponding to the same part of the object, only when the maximum value of the similarity is equal to or greater than a predetermined threshold value. In this case, when the maximum value of similarity is lower than the threshold value, the feature point extracting unit 14 may assume that, on the right image, there is no feature point to match a feature point candidate corresponding to the template, and remove the feature point candidate from the search target of pairs of feature points. As this predetermined threshold value is set higher, the feature point extracting unit 14 is able to improve the reliability that a pair of feature points corresponds to the same point. For example, the predetermined threshold value is set to a value given by multiplying the maximum value which the similarity can take, by 0.8 to 0.9. Alternately, the feature point extracting unit 14 may increase the predetermined threshold value as the number of feature point candidates extracted from the left image is greater. By this means, when the number of feature point candidates extracted from one image is large, the feature point extracting unit 14 is able to extract only pairs of feature points having a high possibility of corresponding to the same points. Also, even when the number of feature point candidates extracted from one image is small, the feature point extracting unit 14 is able to extract a sufficient number of pairs of feature points to obtain the correction parameters.

For every pair of feature points acquired, the feature point extracting unit 14 notifies the correction parameter calculation unit 15 of the horizontal coordinate values and vertical coordinate values of the two feature points.

To match the position of the object captured in the left image with the position of the object captured in the right image, the correction parameter calculation unit 15 calculates a set of correction parameters for correcting the image captured in at least one of the left image and the right image.

The difference between the position of the object on the left image and the position of the object on the right image can be corrected by performing projective transformation with respect to the image on at least one of the images, to be virtually an image as seen from the same direction as the direction from which the other image is photographed. This projective transformation is represented, for example, by the following equations:

$$\begin{pmatrix} u \\ v \\ 1 \end{pmatrix} = ARA^{-1} \begin{pmatrix} x \\ y \\ 1 \end{pmatrix}$$ (Equations 3)

$$\begin{pmatrix} x' \\ y' \\ 1 \end{pmatrix} = Rz \begin{pmatrix} u - W/2 \\ v - H/2 \\ 1 \end{pmatrix} + T$$

$$R = \begin{pmatrix} 1 & 0 & 0 \\ 0 & \cos\theta_x & \sin\theta_x \\ 0 & -\sin\theta_x & \cos\theta_x \end{pmatrix} \begin{pmatrix} \cos\theta_y & 0 & -\sin\theta_y \\ 0 & 1 & 0 \\ \sin\theta_y & 0 & \cos\theta_y \end{pmatrix}$$

$$A = \begin{pmatrix} f & 0 & 0 \\ 0 & f & 0 \\ 0 & 0 & 1 \end{pmatrix}$$

$$Rz = \begin{pmatrix} \cos\theta_z & -\sin\theta_z & 0 \\ \sin\theta_z & \cos\theta_z & 0 \\ 0 & 0 & 1 \end{pmatrix}$$

$$T = \begin{pmatrix} W/2 \\ H/2 \\ 0 \end{pmatrix}$$

(x, y) are the horizontal direction coordinate and vertical direction coordinate of a point of interest on the image of the correction target (in this example, the left image), and (x', y') are the horizontal direction coordinate and vertical direction coordinate of the point of interest on the image after correction. In addition, $\theta_x$ and $\theta_y$ represent the rotation angles of the optical axis of the imaging optical system corresponding to the correction target image of the two images in the horizontal direction and the vertical direction, with respect to the optical axis of the imaging optical system corresponding to the image (in this example, the right image) not being the correction target of the two images. Further, $\theta_z$ is the rotation angle of the correction target image with respect to the optical axis of the imaging optical system corresponding to the image not being the correction target, as the center of rotation. Further, f is the focal distance of the imaging optical systems corresponding to the image of the correction target and the image not being the correction target, and, in the present embodiment, f is the focal distance of the imaging optical system of the imaging unit 2. Then, the coordinate of a point on an image corresponding to the point where the optical axis of the imaging optical system and the imaging plane intersect, is represented as (W/2, H/2). W is the width of the image and H is the height of the image. Consequently, the parameters $\theta_x$, $\theta_y$ and $\theta_z$ are each a correction parameter. Further, assuming that projective transformation is performed using an arbitrary matrix of 3 rows×3 columns, the correction parameter calculation unit 15 may use the nine elements contained in the matrix as correction parameters. Alternately, the correction parameter calculation unit 15 may normalize all of the elements such that, among the nine elements of the projective transformation matrix of 3 rows×3 columns, one of the non-zero elements becomes 1, and use eight elements as correction parameters.

The correction parameter calculation unit 15 determines the parameters $\theta_x$, $\theta_y$ and $\theta_z$, using, for example, the minimum square method. In other words, using the parameters $\theta_x$, $\theta_y$ and $\theta_z$ as variables, for each of a plurality of pairs of feature points, the correction parameter calculation unit 15 converts the coordinates of feature points on at least one of the left image and the right image according to equations (3), and obtains the square of the distance between the feature points after the conversion. Then, the correction parameter calculation unit 15 obtains the mean square value of the distance with respect to each pair of feature points. The correction parameter calculation unit 15 uses the parameters $\theta_x$, $\theta_y$ and $\theta_z$ to minimize this mean square value as the set of correction parameters. According to the present embodiment, the correction parameter calculation unit 15 obtains the set of correction parameters ($\theta_x$, $\theta_y$ and $\theta_z$) for performing projective transformation of the left image according to equations (3). However, the correction parameter calculation unit 15 may obtain the set of correction parameters ($\theta_x$, $\theta_y$ and $\theta_z$) for performing projective transformation of the right image according to equations (3). The correction parameter calculation unit 15 passes the set of correction parameters ($\theta_x$, $\theta_y$, and $\theta_z$) to the correction unit 16.

The correction unit 16 generates a stereoscopic image by correcting at least one of the object on the left image and the object on the right image, using the calculated set of correction parameters. In the present embodiment, the correction unit 16 performs projective transformation for each pixel of the left image according to the equations given by applying the set of correction parameters to equations (3). Then, the pair of the left image acquired and the corresponding right image makes a stereoscopic image.

Note that the correction unit 16 may correct the position of each pixel of the right image, instead of correcting the position of each pixel of the left image. In this case, in equations 3, the correction unit 16 may make the set of correction parameters ($\theta_x$, $\theta_y$ and $\theta_z$) be ($-\theta_x$, $-\theta_y$, and $-\theta_z$). Alternatively, the correction unit 16 may correct the position of each pixel of the left image and the position of each pixel of the right image according to equations (3). In this case, the set of correction parameters to apply to the left image may be ($\theta_x/2$, $\theta_y/2$ and $\theta_z/2$), and the set of correction parameters to apply to the right image may be ($-\theta_x/2$, $-\theta_y/2$ and $-\theta_z/2$).

The stereoscopic image generating device 6 displays the acquired stereoscopic image on the display unit 4 or stores the acquired stereoscopic image in the storage unit 5.

Figure 5:
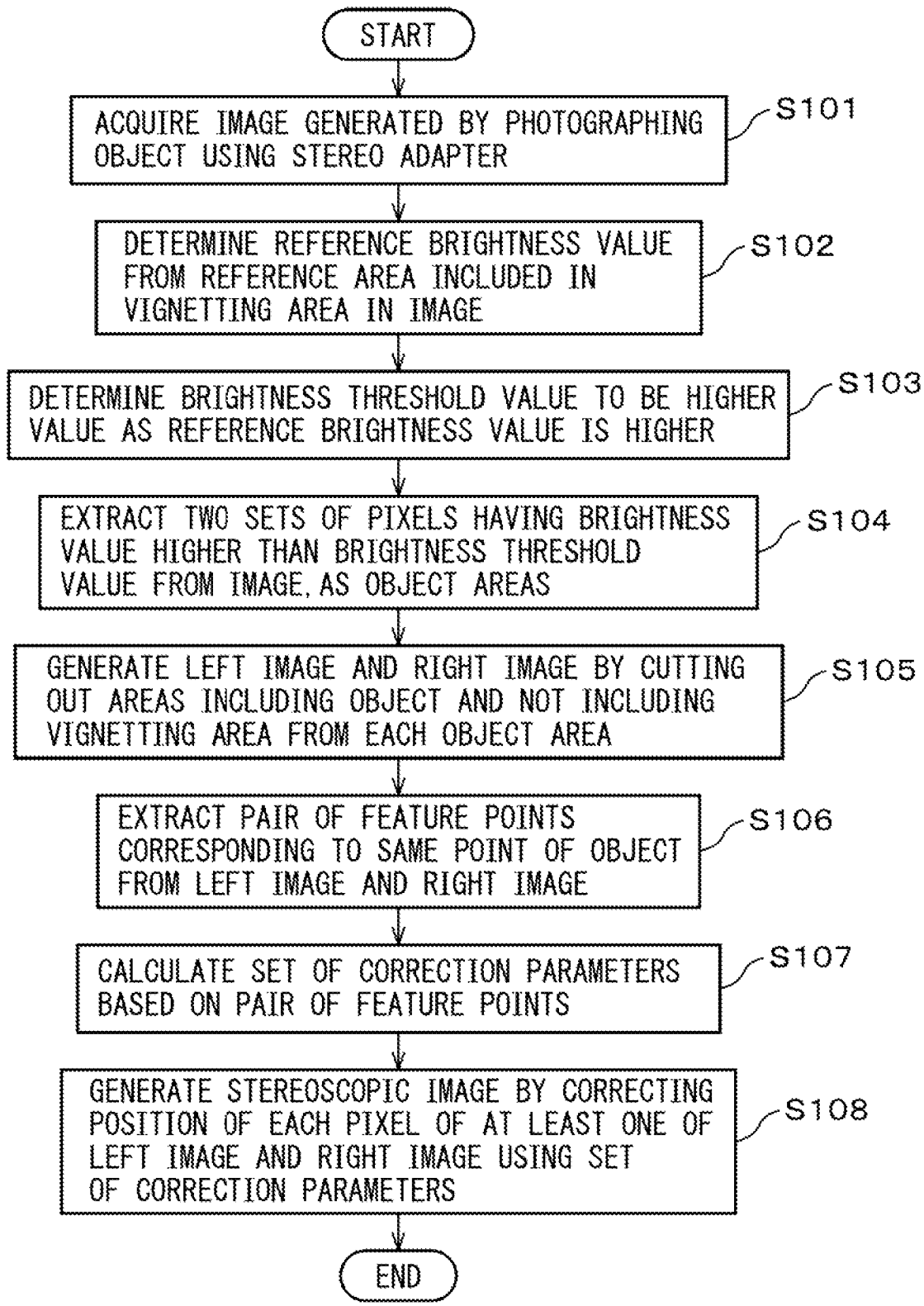
FIG. 5 is an operation flowchart of a stereoscopic image generating process.

FIG. 5 is an operation flowchart of the stereoscopic image generating process that is executed by the stereoscopic image generating device 6. The stereoscopic image generating device 6 acquires an image generated by photographing an object using the stereo adapter 8, from the imaging unit 2 (step S101). Then, the stereoscopic image generating device 6 stores the image in the buffer 10. The brightness calculation unit 11 determines a reference brightness value from the reference area included in the vignetting area in the image (step S102). Then, the brightness calculation unit 11 passes the reference brightness value to the brightness threshold value determining unit 12. The brightness threshold value determining unit 12 determines the brightness threshold value to be a higher value as the reference brightness value is greater (step S103). Then, the brightness threshold value determining unit 12 passes the brightness threshold value to the object area extracting unit 13.

The object area extracting unit 13 reads an image from the buffer 10, and extracts, from the image, two sets of pixels having brightness values higher than the brightness threshold value, as object areas (step S104). Then, the object area extracting unit 13 generates the left image and the right image by cutting out, from each object area, an area including the object and not including the vignetting area (step S105). The object area extracting unit 13 stores the left image and the right image in the buffer 10 and also passes the left image and the right image to the feature point extracting unit 14.

The feature point extracting unit 14 extracts a pair of feature points corresponding to the same point of the object, from the left image and the right image (step S106). Then, the feature point extracting unit 14 passes the coordinates of each feature point included in the pair of feature points, to the correction parameter calculation unit 15.

The correction parameter calculation unit 15 calculates the set of correction parameters based on the pair of feature points (step S107). Then, the correction parameter calculation unit 15 passes the set of correction parameters to the correction unit 16.

The correction unit 16 reads out the left image and the right image from the buffer 10, and, by correcting the position of each pixel of at least one image of the left image and the right image, using the set of correction parameters, generates a stereoscopic image (step S108). Then, the stereoscopic image generating device 6 outputs the generated stereoscopic image, and finishes the stereoscopic image generating process.

As described above, on an image generated by photographing an object using a stereo adapter, this stereoscopic image generating device determines the brightness threshold value for extracting the object areas, based on the brightness of the reference area included in vignetting area, regardless of the mounting position of the stereo adapter. Consequently, even when the mounting position of the stereo adapter shifts, this stereoscopic image generating device is able to extract the object area accurately, and therefore is able to prevent a vignetting area from being included in the left image and the right image included in the stereoscopic image.

Next, a stereoscopic image generating device according to a second embodiment will be described. This stereoscopic image generating device, once a set of correction parameters has been calculated by executing a calibration process, stores the set of correction parameters. Then, for a pair of a left image and a right image acquired later, this stereoscopic image generating device generates a stereoscopic image by correcting the position of the object on at least one of the left image and the right image, using the set of correction parameters.

Figure 6:
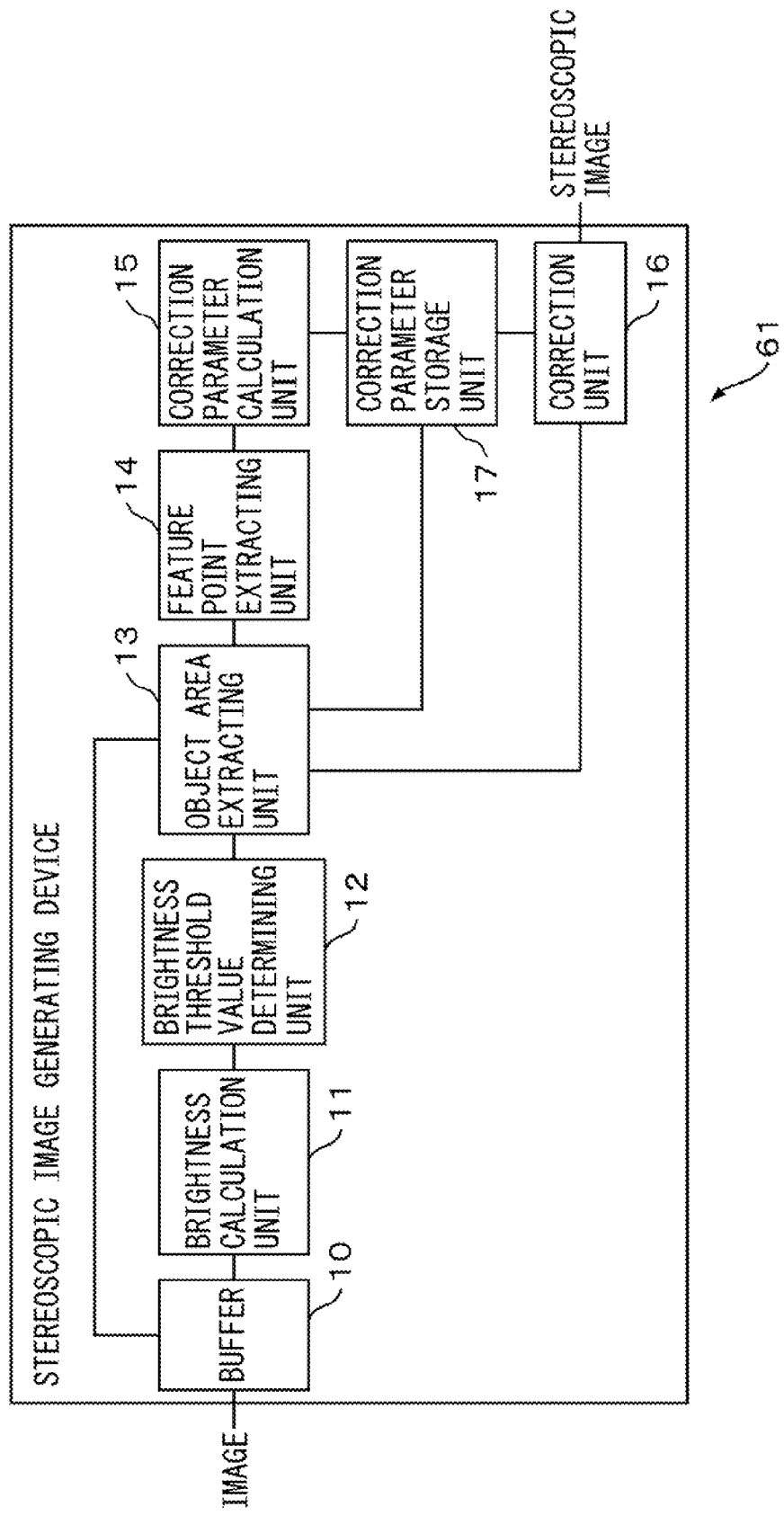
FIG. 6 is a configuration diagram of a stereoscopic image generating device according to a second embodiment.

FIG. 6 is a configuration diagram of the stereoscopic image generating device according to the second embodiment. The stereoscopic image generating device 61 according to the second embodiment includes: a buffer 10, a brightness calculation unit 11, a brightness threshold value determining unit 12, an object area extracting unit 13, a feature point extracting unit 14, a correction parameter calculation unit 15, a correction unit 16, and a correction parameter storage unit 17. In FIG. 6, the units of the stereoscopic image generating device 61 are assigned the same reference numerals as the reference numerals of the corresponding components of the stereoscopic image generating device 61 of the first embodiment illustrated in FIG. 4.

The stereoscopic image generating device 61 according to the second embodiment differs from the stereoscopic image generating device 6 according to the first embodiment with respect to the correction parameter storage unit 17. Therefore, the correction parameter storage unit 17 and its related parts will be described below. As for the other components of the stereoscopic image generating device 61, see the descriptions of the corresponding components of the stereoscopic image generating device according to the first embodiment.

The correction parameter storage unit 17 has, for example, a readable and writable, and non-volatile semiconductor memory circuit. Then, the correction parameter storage unit 17 stores the cutting ranges of the left image and the right image, received from the object area extracting unit 13, and a set of correction parameters received from the correction parameter calculation unit 15.

In the present embodiment, the set of correction parameters is determined by executing steps S101 to S107 in the operation flowchart illustrated in FIG. 5, when, for example, a calibration process is executed on a digital camera mounting the stereoscopic image generating device 61. Then, the stereoscopic image generating device 61 finishes the calibration process.

In addition, upon normal photographing, the stereoscopic image generating device 61 executes only the processes of steps S101, S105 and S108, without executing the processes of steps S102 to S104, S106 and S107. To be more specific, every time acquiring an image generated by photographing an object using the stereo adapter 8 from the imaging unit 2, the stereoscopic image generating device 61 generates the left image and the right image by trimming the image based on the cutting ranges of the left image and the right image stored in the correction parameter storage unit 17. Then, the stereoscopic image generating device 61 generates a stereoscopic image by correcting the position of each pixel in at least one of the left image and the right image, according to equations (3), using the set of correction parameters stored in the correction parameter storage unit 17.

According to the second embodiment, the stereoscopic image generating device does not have to determine the cutting ranges of the left image and the right image and a set of correction parameters upon every shot, and therefore is able to reduce the amount of calculation to generate a stereoscopic image upon photographing. Further, when generating a stereoscopic image from a plurality of images that are continuous in time like a movie, the stereoscopic image generating device is able to use the same cutting ranges for each image. Consequently, this stereoscopic image generating device is able to prevent the positional relationship between the object on the left image and the object on the right image from varying over time.

Note that, in the first embodiment, the stereoscopic image generating device may use the left image and the right image themselves, which are cut out by the object area extracting unit from an image received from the imaging unit, as a stereoscopic image. In this case, the feature point extracting unit, the correction parameter calculation unit and the correction unit may be omitted. Then, the processes of steps S106 to S108 in the operation flowchart of the stereoscopic image generating process illustrated in FIG. 5 are omitted as well.

Similarly, in the second embodiment, the stereoscopic image generating device may obtain cutting ranges of the left image and the right image and stores the cutting ranges in the correction parameter storage unit, in the calibration process, without calculating a set of correction parameters. Then, upon normal photographing, the stereoscopic image generating device generates the left image and the right image by trimming an image according to the cutting ranges of the left image and right image, and make the pair of the left image and the right image be a stereoscopic image. Consequently, in this variation, the feature point extracting unit, the correction parameter calculation unit and the correction unit may be omitted. Especially when the difference between the shape of the object on the left image and the shape of the object on the right image is negligibly small, these variations are able to suppress the deterioration of the quality of the stereoscopic image and reduce the amount of calculation in the stereoscopic image generating process.

Next, a stereoscopic image generating device according to a third embodiment will be described. In order to apply the cutting ranges of the left image and right image that are determined based on the resolution of the original image generated by the imaging unit, to an image having a different resolution from that of the original image, this stereoscopic image generating device corrects the cutting ranges.

The stereoscopic image generating device according to the third embodiment has the same components as the components provided in the stereoscopic image generating device 61 according to the second embodiment. However, the stereoscopic image generating device according to the third embodiment differs from the stereoscopic image generating device 61 according to the second embodiment with respect to receiving a processing target image that has a different resolution from the resolution of the original image, and with respect to the object area extracting unit 13. Therefore, units relating to use of the processing target image, and the object area extracting unit 13, will be described below. As for the other components of the stereoscopic image generating device, see the descriptions of the corresponding components of the stereoscopic image generating device according to the first or second embodiment.

The stereoscopic image generating device receives an original image, which are generated by photographing an object using the stereo adapter 8, from the imaging unit 2, and stores this original image in the buffer 10. Further, the stereoscopic image generating device receives the processing target image from the control unit 7 of the digital camera 1, and stores this processing target image in the buffer 10. The processing target image is generated by, for example, sampling pixels from the original image at predetermined pitches, or by dividing one pixel into a plurality of pixels.

When calibrating, the object area extracting unit 13 determines the cutting ranges of the left image and right image based on the original image. Then, the object area extracting unit 13 stores information representing the border of the cutting ranges, in the correction parameter storage unit 17.

Upon normal photographing, the object area extracting unit 13 reads the processing target image from the buffer 10. Further, the object area extracting unit 13 reads information representing the border of the cutting ranges, from the correction parameter storage unit 17. Then, the object area extracting unit 13 corrects the horizontal coordinate representing the border of the cutting ranges by multiplying the horizontal coordinate of the border by a ratio (W'/W). W' is the number of pixels of the processing target image in the horizontal direction, and W is the number of pixels of the original image in the horizontal direction. Similarly, the object area extracting unit 13 corrects the vertical coordinate representing the border of the cutting ranges by multiplying the vertical coordinate of the border by the ratio (H'/H). H' is the number of pixels of the processing target image in the vertical direction, and H is the number of pixels of the original image in the vertical direction.

Then, from the processing target image, the object area extracting unit 13 cuts the left image and the right image according to the corrected cutting ranges, and passes these left image and right image to the correction unit 16.

The correction unit 16 corrects the elements of a projective transformation matrix that is acquired based on a set of correction parameters, based on the ratios of the numbers of pixels of the processing target image in the horizontal direction and in the vertical direction, to the numbers of pixels of the original image in the horizontal direction and in the vertical direction. For example, the correction unit 16 converts the projective transformation matrix based on the ratio of the number of pixels of the original image and the number of pixels of the processing target image, according to the following equation:

$$P' = \begin{pmatrix} P_{11} & P_{12} \cdot R_h/R_v & P_{13} \cdot R_h \\ P_{21} \cdot R_v/R_h & P_{22} & P_{23} \cdot R_v \\ P_{13}/R_h & P_{23}/R_v & P_{33} \end{pmatrix} \quad \text{(Equation 4)}$$

j=1, 2, 3) is the element of the i-th row and the j-th column in the projective transformation matrix based on a set of correction parameters that is calculated based on the original image. This projective transformation matrix can be made a matrix that represents the transform matrix $ARA^{-1}$ and the transform matrix Rz in equations (3) together in one. Further, in equations (3), the width W in the horizontal direction and the height H in the vertical direction are the width in the horizontal direction and the height in the vertical direction of the processing target image. Further, Rh is the ratio ($N_{ho}/N_{hp}$). $N_{ho}$ is the number of pixels in the horizontal direction of the area included in the processing target image corresponding to the left image or the right image, and $N_{hp}$ is the number of pixels in the horizontal direction of the left image or the right image extracted from the original image.

Similarly, $R_V$ is the ratio ($N_{vo}/N_{vp}$). $N_{vo}$ is the number of pixels in the vertical direction of the area included in the processing target image corresponding to the left image or the right image, and $N_{vp}$ is the number of pixels in the vertical direction of the left image or the right image extracted from the original image. Then, P' is the projective transformation matrix after conversion.

The correction unit 16 generates a stereoscopic image by correcting the position of each pixel in at least one of the left image and the right image extracted from the processing target image using the converted projective transformation matrix.

According to this embodiment, the stereoscopic image generating device can cut out the left image and the right image, from even an image having a different size from the size of the original image, without obtaining the left image and right image cutting ranges again. Consequently, this stereoscopic image generating device can reduce the amount of calculation to be required to determine the left image and right image cutting ranges.

According to a variation, the stereoscopic image generating device may determine the cutting ranges of the left image and right image based on the processing target image itself. In this case, the stereoscopic image generating device converts the size of the reference area that is set in advance for the original image, and the size of the left image and the right image to cut from the processing target image, based on the ratio of the number of pixels of the processing target image to the number of pixels of the original image. After that, the stereoscopic image generating device may determine the cutting ranges of the left image and right image by applying the same process as the stereoscopic image generating process that is executed by the stereoscopic image generating device according to the first embodiment, to the processing target image.

Next, a stereoscopic image generating device according to a fourth embodiment will be described. This stereoscopic image generating device obtains a relation equation between the reference brightness value and the brightness threshold value based on pairs of reference brightness values and brightness threshold values that are determined from each a plurality of sample images generated by photographing using a stereo adapter in different photographing conditions or environmental conditions.

FIG. 7 is a configuration diagram of a stereoscopic image generating device according to a fourth embodiment. The stereoscopic image generating device 62 according to the fourth embodiment includes a buffer 10, a brightness calculation unit 11, a brightness threshold value determining unit 12, an object area extracting unit 13, a feature point extracting unit 14, a correction parameter calculation unit 15, a correction unit 16, a sample storage unit 18 and a coefficient determining unit 19. In FIG. 7, the units of the stereoscopic image generating device 62 are assigned the same reference numerals as the reference numerals of the corresponding components of the stereoscopic image generating device 6 of the first embodiment illustrated in FIG. 4.

The stereoscopic image generating device 62 according to the fourth embodiment differs from the stereoscopic image generating device 6 according to the first embodiment with respect to having the sample storage unit 18 and the coefficient determining unit 19. Therefore, the sample storage unit 18, the coefficient determining unit 19 and their related parts will be described below. As for the other components of the stereoscopic image generating device 62, see the descriptions of the corresponding components of the stereoscopic image generating device according to the first embodiment.

The sample storage unit 18 has, for example, a non-volatile semiconductor memory circuit, and stores a plurality of pairs of reference brightness values and brightness threshold values, which are determined from a plurality of sample images generated by photographing using the stereo adapter 8 based on different photographing conditions or different environmental conditions. Note that the brightness threshold value for sample images is determined experimentally so that the object area can be extracted accurately, as described with reference to the first embodiment. On the other hand, the reference brightness value for sample images can be found by performing the same process as the process executed by the brightness calculation unit 11, with the sample image.

The coefficient determining unit 19 obtains the relation equation between the reference brightness value and the brightness threshold value based on a plurality of pairs reference brightness values and brightness threshold values stored in the sample storage unit 18. For example, when the digital camera that has the stereoscopic image generating device 62 mounted is powered on for the first time, or when the calibration process is performed for the digital camera, the coefficient determining unit 19 reads the pairs of reference brightness values and brightness threshold values from the sample storage unit 18. Then, as described with respect to the first embodiment, the coefficient determining unit 19 determines a and p for the pair of the reference brightness value and the brightness threshold value found for each sample image, such that the square sum of error as of when equation (1) or equation (2) is applied becomes the minimum. At this time, the coefficient determining unit 19 may uses, for example, the steepest descent method or the simulated annealing method.

The coefficient determining unit 19 reports the coefficients $\alpha$ and $\beta$, to the brightness threshold value determining unit 12. Then, the brightness threshold value determining unit 12 determines the brightness threshold value corresponding to the reference brightness value calculated by the brightness calculation unit 11, using the coefficients $\alpha$ and $\beta$ received from the coefficient determining unit 19.

The functions of the units of the stereoscopic image generating devices according to the above embodiments or their variations may be implemented by a computer program to be executed on a processor. Such a computer program may be provided recorded on a computer-readable recording medium such as a magnetic recording medium, an optical recording medium, and so on. However, the computer-readable recording medium does not include a carrier wave.

FIG. 8 is configuration diagram of a computer that operates as a stereoscopic image generating device according to an embodiment described above or its variation when a computer program to realize the functions of the units of the stereoscopic image generating device operates.

The computer 100 includes a user interface unit 101, a communication interface unit 102, a storage unit 103, a storage medium access medium 104 and a processor 105. The processor 105 is connected with the user interface unit 101, communication interface unit 102, storage unit 103 and storage medium access medium 104, via a bus, for example.

The user interface unit 101 includes, for example, an input device such as a keyboard and a mouse, and a display device such as a liquid crystal display. Alternately, the user interface unit 101 may include a device that integrates an input device and a display device, such as a touch panel display. Then, the user interface unit 101 outputs, for example, an operation signal to start the process of generating a stereoscopic image, in response to user operation, to the processor 105.

The communication interface unit 102 may have a communication interface for connecting the computer 100 with an imaging device (not illustrated) to which a stereo adapter can be attached or detached, and its control circuit. This communication interface may be made, for example, a universal serial bus (USB).

Furthermore, the communication interface unit 102 may include a communication interface for connecting with a communication network in compliance with a communication standard such as Ethernet (registered trademark), and its control circuit. In this case, the communication interface unit 102 acquires an image photographing an object using the stereo adapter, from the imaging device, the camera or other devices connected to the communication network, and passes the image to the processor 105. In addition, the communication interface unit 102 may output a stereoscopic image received from the processor 105, to other devices, via the communication network.

The storage unit 103 may have, for example, a readable and writable semiconductor memory and a read-only semiconductor memory. Then, the storage unit 103 stores a computer program for executing the stereoscopic image generating process, which is executed on the processor 105, and stores data, including the range of the reference area, the coefficients $\alpha$ and $\beta$ in above equation (1) or equation (2), the size of the left image and the right image and so on, used in the stereoscopic image generating process. Also, the storage unit 103 stores an image received via the communication interface unit 102, or a stereoscopic image generated by the processor 105 and so on.

The storage medium access device 104 is a device to access the storage medium 106, which is, for example, a magnetic disk, a semiconductor memory card, or an optical storage medium. The storage medium access device 104 reads the computer program for the stereoscopic image generation process, that is stored in the storage medium 106 and that is executed on the processor 105, and passes this computer program to the processor 105. The storage medium access device 104 may also write a stereoscopic image that is generated by the processor 105, in the storage medium 106.

The processor 105 generates a stereoscopic image from an image photographing an object using a stereo adapter, by executing a computer program for the stereoscopic image generating process according to one of the above embodiments or variation. Then, the processor 105 stores the generated stereoscopic image in the storage unit 103 or outputs that generated stereoscopic image to other devices via the interface unit 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present inventions have been described in detail, it should be understood that the various changes, substitutions, and alterations could be made hereto without departing from the spirit and scope of the invention.

What is claimed is:

1. A stereoscopic image generating device comprising:
a brightness calculation unit that, on an image that is generated by photographing an object using a stereo adapter that divides light from the object into two beams and guides the two beams to an imaging unit, obtains a brightness representative value of a first area where the two beams are not incident and vignetting occurs even if a mounting position of the stereo adapter to the imaging unit jolts out of alignment;
a threshold value determining unit that, based on a relationship between the brightness representative value and a threshold value for distinguishing between a pixel included in the first area on the image, and a pixel included in one of a second area where one of the two beams is incident and a third area where the other of the two beams is incident, determines the threshold value corresponding to the brightness representative value; and
an object area extracting unit that compares a brightness value of each pixel included in an area on the image which differs from the first area with the threshold value to extract two sets of pixels having brightness value higher than the threshold value on the image, as the second area and the third area, and produces a stereoscopic image by a pair of a first partial image that is cut out from the second area, and a second partial image that is cut out from the third area.

2. The stereoscopic image generating device according to claim 1, wherein the threshold value determining unit increases the threshold value as the brightness representative value is higher.

3. A stereoscopic image generating method comprising:
obtaining, on an image that is generated by photographing an object using a stereo adapter that divides light from the object into two beams and guides the two beams to an imaging unit, a brightness representative value of a first area where the two beams are not incident and vignetting occurs even if a mounting position of the stereo adapter to the imaging unit jolts out of alignment;
determining, based on a relationship between the brightness representative value and a threshold value for distinguishing between a pixel included in the first area on the image, and a pixel included in one of a second area where one of the two beams is incident and a third area where the other of the two beams is incident, the threshold value corresponding to the brightness representative value; and
comparing a brightness value of each pixel included in an area on the image which differs from the first area with the threshold value to extract two sets of pixels having brightness value higher than the threshold value on the image, as the second area and the third area, and producing a stereoscopic image by a pair of a first partial image that is cut out from the second area, and a second partial image that is cut out from the third area.

4. The stereoscopic image generating method according to claim 3, wherein the threshold value is determined so that the threshold value increases as the brightness representative value is higher.

5. A non-transitory computer readable recording medium storing a computer program for generating a stereoscopic image, the computer program causing a computer to execute:
obtaining, on an image that is generated by photographing an object using a stereo adapter that divides light from the object into two beams and guides the two beams to an imaging unit, a brightness representative value of a first area where the two beams are not incident and vignetting occurs even if a mounting position of the stereo adapter to the imaging unit jolts out of alignment;
determining, based on a relationship between the brightness representative value and a threshold value for distinguishing between a pixel included in the first area on the image, and a pixel included in one of a second area where one of the two beams is incident and a third area where the other of the two beams is incident, the threshold value corresponding to the brightness representative value; and
comparing a brightness value of each pixel included in an area on the image which differs from the first area with the threshold value to extract two sets of pixels having brightness value higher than the threshold value on the image, as the second area and the third area, and producing a stereoscopic image by a pair of a first partial image that is cut out from the second area, and a second partial image that is cut out from the third area.

6. A stereoscopic imaging device comprising:
an imaging unit that generates an image by photographing an object;
a stereo adapter that is placed in a front plane of the imaging unit, divides light from the object into two beams and guides the two beams to the imaging unit, and generates two images of the object on the image; and
a processor adapted to:
obtain, on the image, a brightness representative value of a first area where the two beams are not incident and vignetting occurs even if a mounting position of the stereo adapter to the imaging unit jolts out of alignment;

determine, based on a relationship between the brightness representative value and a threshold value for distinguishing between a pixel included in the first area on the image, and a pixel included in one of a second area where one of the two beams is incident and a third area where the other of the two beams is incident, the threshold value corresponding to the brightness representative value; and compare a brightness value of each pixel included in an area on the image which differs from the first area with the threshold value to extract two sets of pixels having brightness value higher than the threshold value on the image, as the second area and the third area, and produce a stereoscopic image by a pair of a first partial image that is cut out from the second area, and a second partial image that is cut out from the third area.

* * * * *